May 26, 1970     W. E. ALEXANDER     3,514,601
TRANSDUCER APPARATUS FOR THERMAL FLUX MEASUREMENT
Filed Aug. 5, 1968
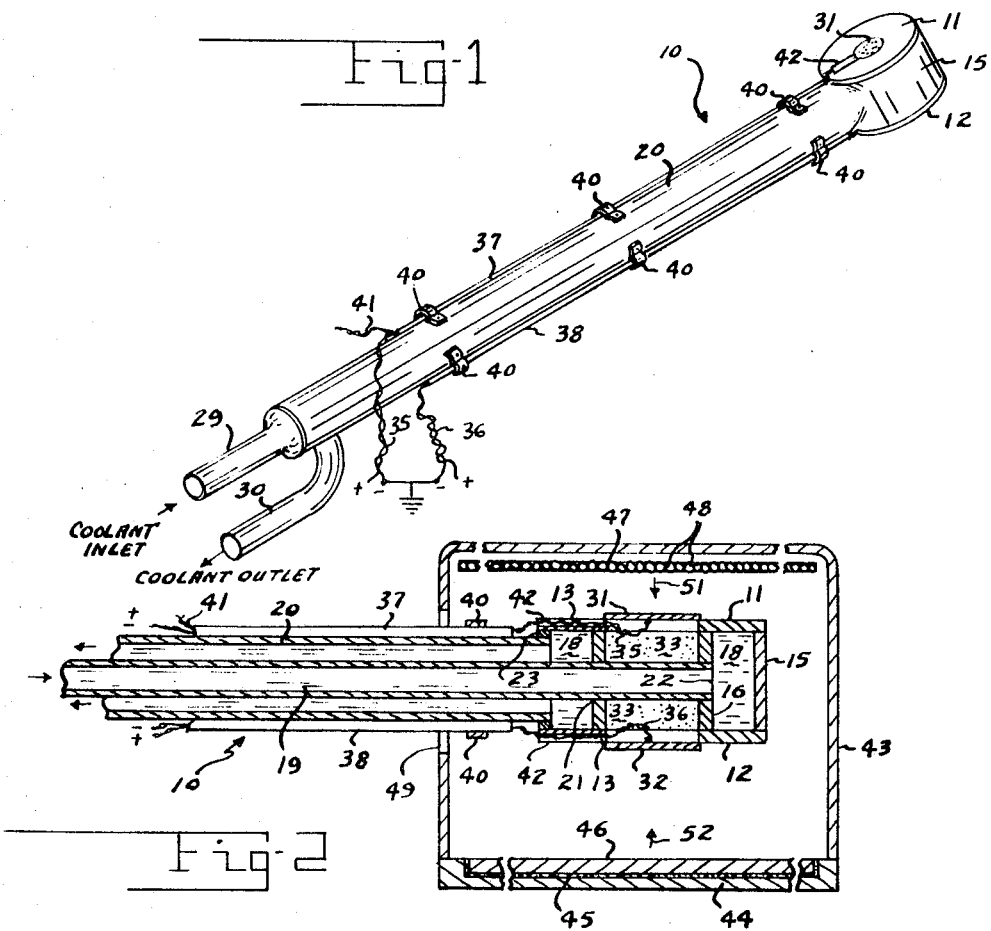
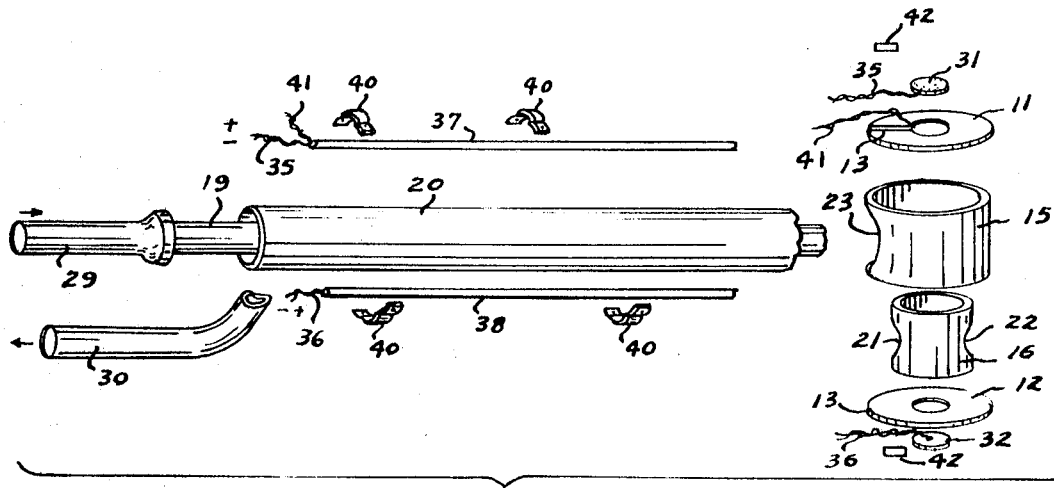
INVENTOR.
WILLIAM E. ALEXANDER
BY Harry A. Herbert Jr.
and Albert H. Reutler
ATTORNEYS

United States Patent Office 3,514,601
Patented May 26, 1970

3,514,601
TRANSDUCER APPARATUS FOR THERMAL
FLUX MEASUREMENT
William E. Alexander, Yellow Springs, Ohio, assignor to
the United States of America as represented by the
Secretary of the Air Force
Filed Aug. 5, 1968, Ser. No. 750,330
Int. Cl. G01t 1/16
U.S. Cl. 250—83
9 Claims

ABSTRACT OF THE DISCLOSURE

A flux metering apparatus for sensing net thermal radiation between heat source and test structure to obtain transducer electrical output signal independently of test structure properties and where temperatures exceed usable limits of thermocouples in oxydizing atmospheres. Two metal discs receive radiant thermal energy from two opposing directions. Two thermocouples monitor the temperatures at the center of corresponding discs so that difference in their signals is proportional to net thermal flux impinging on the discs. The discs are thermally isolated from each other and welded peripherally to a liquid cooled heat sink which has a chamber that interconnects concentric inlet and outlet tubes.

BACKGROUND OF THE INVENTION

Field of the invention

This invention relates to simulated aerodynamic heating and, more particularly, to heat sensing apparatus that has transducer electrical output useable for determining test structure characteristics.

Description of the prior art

Control of simulated aerodynamic heating for structural tests is presently a complex task requiring automatic computer calculations. Among limitations of computer method of thermal test control and evaluation are the degree to which thermal physical property data is known or surface temperature measurements are practical, much as with thermocouples that are able to withstand only limited amount of heat. Concern over these limitations increases in importance as advanced structural materials have effective thermophysical properties unknown prior to time of testing. Test problems are encountered with structural concepts of honeycombed, foamed ceramic, coated refractory and composite aerospace components which are among those having undefined thermophysical properties. There is difficulty in providing preprogrammed adiabatic wall temperature values, convective heat coefficient or other structural thermophysical property data which are necessary computer inputs, as is a surface temperature signal generated during aerodynamic heating tests. Only with proper inputs can computer method of thermal control provide instantaneous calculation of flight aerodynamic convective heating and radiant heating losses or enthalpy increases as a function of structural surface temperature rise rates. Need exists to circumvent present computer method limitations and for thermal test control from ambient temperatures to above 3500° F., and when structural properties are undefined, representing instances where heat rate computers are unusable. Also, an inexpensive device to perform thermal test work is neeeded where availability of heat rate computers is cost prohibitive and where higher heat is detrimental to thermocouple wires.

U.S. Pat. 3,147,433—Claussen issued Sept. 1, 1964 on Apparatus for Measuring High Temperature and Pressure Utilizing Thermocouples is representative of other known art.

SUMMARY OF THE INVENTION

The transducer apparatus comprises a water cooled heat sink which forms the main body assembly, two low conductivity metal discs which form the thermally sensitive elements secured to the main body assembly, and two fine wire thermocouples that monitor the temperatures centrally of each disc. The main body assembly has a water inlet tube that is concentric within the water outlet tube. An annular chamber is formed by structure of the heat sink to which periphery of each disc is secured and this chamber interconnects the water inlet and outlet tubes. The transducer is usable for net thermal flux readings and for separate absolute thermal flux measurement in opposite directions, to evaluate heat sources under control from ambient temperature to above 3500° F., to detect presence of burning as a safety warning device, and for thermal testing of structures that have unknown thermophysical properties.

BRIEF DESCRIPTION OF THE DRAWING

FIG. 1 is a perspective view of a transducer apparatus of this invention.

FIG. 2 is a cross sectioned elevational view of the transducer apparatus of FIG. 1.

FIG. 3 is an exploded perspective view of the transducer apparatus.

DESCRIPTION OF THE PREFERRED EMBODIMENT

Referring to FIG. 1, transducer apparatus 10 includes a main body assembly that has a liquid cooled heat sink, shown in detail in views of FIGS. 2 and 3. The main body has a pair of annular plates 11 and 12 each centrally apertured and each provided with a radial groove 13 that extends between the central aperture and peripheral edge of each plate. Concentrically between the plates 11 and 12 there is an outer cylinder 15 and an inner cylinder 16 which form an annular chamber 18 therebetween. This annular chamber 18 interconnects a coolant inlet tube 19 and outlet tube 20. The inlet tube 19 is brazed to the inner cylinder 16 along peripheral edges of openings 21 and 22. The outlet tube 20 is brazed to the inner cylinder 16 along the peripheral edge of opening 23. The plates 11 and 12 are brazed to opposite ends of the cylinders 15 and 16. The plates, tubes and cylinders are made of metal, preferably copper, and form a channel for water or other liquid coolant. Nitrogen is also usable as a coolant from a suitable supply (not shown). The coolant passes through a supply conduit 29 joined to the inlet tube 19 and comes out through a laterally offset conduit 30 brazed to the outlet tube 20. The main body assembly is gold plated to enhance reflectivity when completely constructed as described. The heat sink is the first of three basic components that form the flux metering apparatus.

The low conductivity metal discs 31 and 32 form thermally sensitive elements and are made of nickel alloy. The discs 31 and 32 are welded peripherally to the plates 11 and 12 at opposite sides of the heat sink structure. A cavity 33 is formed by the inner cylinder 16 that is peripherally blackened with an emissivity coating, lamp black, the same coating applied to the sensitive discs 31 and 32 after the discs are welded in place. The discs 31 and 32 comprise the second basic component of the flux metering apparatus.

The two fine wire thermocouples 35 and 36 are welded to the center of corresponding discs 31 and 32. Positive and negative leads from each of these thermocouples extend from underneath the discs in the cavity 33 and along the grooves 13 of the plates 11 and 12. The thermally sensitive low conductivity discs are made of metal such as specific nickel alloy known as constantan and the fine wire thermocouples are made of 40 gauge Chromel vs. constantan welded to the center of each disc. The thermocouple leads are held by protective metal shields 37 and 38 secured by clips 40 along the outer surface of the outlet tube 20. The two thermocouples are the third basic component of the fluxmeter.

An additional thermocuple 41 is welded terminally to periphery of the aperture in plate 11 and is sensitive to effect of coolant temperature on the heat sink body portion along perihpery of disc 31. The grooves 13 are filled with the thermocouple wires and covered with Nichrome strips 42 as shields. Alumina insulators protect the extended leads from exposure to environmental thermal flux and the Nichrome strips 42 cover such insulated thermocouple wires.

Liquid coolant is supplied through the inlet tube 19 and passes through the chamber 18 of the heat sink which separates the discs 31 and 32 from each other. Coolant passes from the chamber 18 through the inside of the outlet tube 20 which shields the inlet tube 19 from the radiant thermal flux intercepted by the apparatus during use thereof. The main body assembly was plated to increase reflectivity thereof, as noted earlier, and the cavity walls and discs have surfaces coated with lamp black to increase absorbtivity. The discs serve to seal opposite ends of the cavity 33 and the liquid coolant in heat sink chamber and in coolant inlet tube 19 isolates the discs from one another thermally. The cavity 33 is bisected by the inlet tube 19 so that hollow cavity space exists on either side therof in locations undereneath the discs. The thermocouple wires are bowed in the space of the cavity 33 on opposite sides of the inlet tube 19 as best shown in FIG. 2.

FIG. 2 diagrammatically shows the transducer apparatus 10 positioned inside a test housing having a water cooled aluminum reflector cover 43 and a base 44 of "Glasrock" insulation. The base 44 has a central depression in which a felt liner 45 resiliently supports an aerodynamic test structure 46. In a location underneath the top of the cover 43 there is a primary source of heat 47 which includes a plurality of heating elements 48. The cover 43 has a lateral opening 49 through which the transducer apparatus is inserted. A suitable power supply (not shown) is provided for energization of the heating elements 48 of the primary heat source 47.

Radiant thermal energy represented by arrow 51 impinges upon the disc 31 and radiant thermal energy represented by arrow 52 impinges upon the disc 32. The primary source 47 supplies the radiant heat which is emitted in the direction of arrow 51 and to which the test structure 46 is exposed by direct emission and reflection. The test structure 46 is in effect the second heat source from which radiant thermal energy in opposite direction represented by arrow 52 impinges upon the disc 32. Thermophysical properties of the test structure 46 are undefined as noted earlier. The transducer apparatus 10 of this invention is utilized to obtain data for determining test structure characteristics as subsequently described. There is an operation temperature range between ambient conditions and above 3500° F. for which the transducer apparatus 10 is usable. Usually, thermocouples are usable only up to about 2500° F. or at the utmost to 3000° F., which is less than the radiant heating under which the test structure 46 must be analyzed for aerodynamic structural tests and aerospace applications. The two thin metal discs 31 and 32 receive radiant thermal energy from two opposing sources in the direction of arrows 51 and 52 on corresponding sides of the apparatus 10. As noted earlier, each disc is thermally isolated from the other as a result of the cavity 33 being surrounded by heat sink liquid coolant channeled through the annular chamber 18 between the inlet tube 19 and outlet tube 20. Response to cooling is identical to that of heating since no insulation is used behind the sensitive discs 31 and 32. Since the water inlet tube 19 is concentric within the water outlet tube 20, the outflowing water serves as a thermal barrier between the inflowing water and the environmental thermal radiation. Each disc is thermally isolated from the other and welded at its periphery to the water cooled heat sink structure as previously cited. Thus, the temperature of the discs at their periphery is controlled by the temperature of the liquid coolant. When thermal flux of radiant heat impinges on the surface of each disc, heat is conducted radially toward the heat sink structure. Thereby a difference of temperature between each disc center and periphery is created in proportion to radiant thermal flux absorbed by the disc. The two thermocouples 35 and 36 monitor the temperatures at the center of each disc so that the difference in their signals is proportional to the net thermal flux impinging on the discs. Stated in another way, the net thermal flux impinging on the discs is proportional to simulated aerodynamic heating of the test structure 46 when the transducer apparatus 10 is positioned between the test structure 46 and radiant heaters 48 of the primary heat source 47.

The concept of the flux metering apparatus is based upon analytical comparisons of heat transfer to an aerospace vehicle in flight simulated by having heat transfer between a known heat source and an aerospace test structure. The net radiant heating parameter under test is equivalent to the convective minus radiant cooling effect in flight. The transducer apparatus 10 senses the net thermal radiation between the heat source 47 and the test structure 46 as a means of controlling simulated aerodynamic heating. With the transducer device 10 positioned between the heat source 47 and test structure 46, the two opposing thermal sensitive discs 31 and 32 are individually exposed to radiant heat flux. As previously indicated, the disc 31 is exposed to the radiation emitted and reflected from the heat source 47 and the other disc 32 is exposed to the heated test structure 46 providing radiant emissions and reflections. The reactions of each disc are sensed as temperature changes so that the difference in temperatures between the discs provides a measure of the net radiant flux. Interconnection of the "minus" leads of the thermocouple 35 and 36 is used to provide an electrical output signal representative of the net thermal flux proportionately measured by the transducer apparatus 10. Tests over a range between 0 and 30 B.t.u./ft.$^2$ sec. ° F., above an ambient of $4.7 \times 10^{-2}$ B.t.u./ft.$^2$ sec. ° F. prove the practicality of the transducer apparatus 10 for control of simulated aerodynamic heating. It is possible now to conduct the tests of structures for aerospace use even though the structures have undefined thermophysical properties. Thus, the limitations previously noted have been circumvented. Simulated aerodynamic heating control of advanced structural concepts becomes a practicality.

The two thermocouples 35 and 36 are also able to provide two separate output signals which can be analyzed to yield data other than net thermal flux as follows:

(a) The absolute thermal flux in either of two opposed directions is measured by the separate output signals.

(b) If one radiant flux source is the heater 47 and the other the test structure 46, the heater efficiency, the structural surface temperature, or the structural surface temperature rise rate can be measured as:

heater efficiency =
$$\frac{\text{thermal flux absorbed by the structure 46}}{\text{heater thermal output}}$$

heater efficiency =
$$\frac{\text{net flux as measured by transducer apparatus 10}}{\text{measured from the direction of the heater by transducer apparatus 10}}$$

surface temperature rise rate equals a function of
$$\frac{\text{net flux measured by transducer apparatus 10}}{\text{structural density} \times \text{specific heat} \times \text{thickness}}$$

Surface temperature is the product of surface temperature rise rate and the time of linear heating, or, the fourth power of surface temperature equals the fourth power of the heater temperature minus the net flux (as measured by the transducer apparatus 10) divided by the structural emissive power factor.

Net heat transfer rate is an important parameter in test of aerodynamic structure because it is the "forcing function" which causes the structural temperature to increase, thereby giving rise to increased enthalpy, thermal loading and stresses in aerospace components. Each of these effects results from heat absorbtion which is, in turn, a definite function of the net heat transfer occuring within the structure. The primary mode of heat transfer in flight is convective and therefore aerodynamic heating is basically defined mathematically by a convective heating equation. Convective heating of an aerospace structure in flight increases the enthalpy of the structure. Net radiant heating of an aerospace structure under test also increases the enthalpy of the structure. Consequently, the net radiant heating simulates aerodynamic heating if it is controlled to equal convective heating. For net radiant heating to be controlled it must first be monitored electrically, then compared to a programmed aerodynamic heating history in electrical format to produce an error signal. The net radiant heating is then automatically controlled by varying the electrical power to laboratory radiant heaters on the basis of the magnitude of error signal. The net radiant heating can be directly measured by the net radiation thermal flux metering apparatus 10. Thus, a closed loop control of simulated aerodynamic heating is made practical. Thermal control by the previous computer method involves open loop control concept whereas the flux metering apparatus providing net radiation thermal measurements permits closed loop control of the heat source as noted earlier. There is nullification of the requirement for predetermining and preprogramming accurate temperature dependent thermophysical property data and of designing accurate surface temperature measuring devices and attachment techniques. Now the two discs 31 and 32 of the flux metering apparatus 10 are positioned so that one intercepts the radiant flux propagated from the surface of the test structure 46. Then the net thermal flux interchange between the heater and the structure is measurable electrically.

The transducer apparatus 10 for use as a net fluxmeter can be calibrated by using a commercial transfer standard fluxmeter so that both are exposed to a uniformly radiating source. The upper and lower discs are calibrated independently by reference to the transfer standard fluxmeter, commercially available. The commercially available fluxmeters have only one disc and separate parallel inlet and outlet conduits different from the concentric inlet and outlet tubes of the apparatus 10. The additional thermocouple 41 is optional and superfluous for heat sink temperature determination if the transducer apparatus 10 is calibrated against a laboratory standard.

Electric conditioning of the output signal from the thermocouples is not required. Computer use is eliminated. Differential measurement is accomplished by use of the noncontacting transducer apparatus 10. Control of tests above 3500° F. where thermocouple performance previously was unsatisfactory is now a reality due to the combination of the heat sink, thermal discs and thermocouple assembly as noted earlier.

Uses of the transducer apparatus 10 includes the following:

(1) To control simulated aero thermodynamic heating tests of structures.

(a) Provides an inexpensive apparatus for laboratories which do not have heat rate computers to perform thermal testing.

(b) Thermal test control can be effected above 3500° F. and when structural properties are undefined. Both of these are instances where the heat rate computers are unusable.

(2) To evaluate heat sources.

(3) To detect the presence of a burning hydrogen plume against ambient conditions involving use of liquid hydrogen. Under such circumstances, the transducer apparatus serves as a safety warning device.

I claim:

1. An electrical transducer for sensing radiant thermal flux comprising: an annular main body having inner and outer circumferences and having an internal concentric annular chamber for the continuous passage of a coolant, whereby said body acts as a heat sink; thermally sensitive means in disc form attached along its entire periphery to said annular body at its inner circumference, the attachment being of high heat conductivity, whereby conductive heat flow from said thermally sensitive means to said heat sink can take place only at the disc periphery and the absorption of radiant energy by said thermally sensitive means results in center temperatures higher than peripheral temperature; and electric thermocouple means centrally attached to said thermally sensitive means.

2. The apparatus as claimed in claim 1 wherein said main body comprises a pair of metal cylinders concentrically spaced from each other to form an annular heat sink chamber therebetween which is part of the coolant channel, a pair of plates secured to opposite end locations of said cylinders, an inlet tube secured to one of said cylinders and an outlet tube secured to the other of said cylinders, said tubes providing channel passages interconnected by the annular heat sink chamber.

3. The apparatus as claimed in claim 2 wherein said plates have central openings, wherein said thermally sensitive means are metal discs peripherally welded to said plates in position to close the openings at opposite ends of a central isothermal cavity formed inside of said cylinders between said discs.

4. The apparatus as claimed in claim 3 wherein to increase heat absorbtivity there is an emissivity coating on said discs and inner periphery of said cylinder defining the isothermal cavity, and a bright metal plating on said main body to increase reflectivity.

5. The apparatus as claimed in claim 2 wherein said inlet tube is concentrically inside said outlet tube, said outlet tube and coolant in the outlet passage outwardly of said inlet tube being a radiant heat shield for said inlet tube and the coolant inlet passage therein.

6. The apparatus as claimed in claim 3 wherein there are a radiant heat source and a test structure of unknown thermophysical properties from both of which radient heat flux impinges upon said discs in opposing directions so that heat is conducted radially toward said heat sink plate by each of said discs, and said thermocouple wires monitor the temperatures at locations centrally of each disc so that difference in electrical output signals is proportional to net thermal flux impinging on said discs.

7. The apparatus as claimed in claim 6 wherein there are heat shields secured longitudinally along said outlet tube to protect thermocouple wires from radiant heat in a range between ambient conditions to above 3500° F.

8. The apparatus as claimed in claim 7 wherein thermocouple wires secured to each disc have a bowed end inside the isothermal cavity, each of said plates having a groove radially therein, and a metal strip covers said thermocouple wires in the groove longitudinally of said heat shields.

9. The apparatus as claimed in claim 8 wherein an additional thermocouple is welded at juncture of one disc periphery with said heat sink main body, said additional thermocouple also being in one groove and extending longitudinally of said metal strip and heat shield.

References Cited

UNITED STATES PATENTS

| | | | |
|---|---|---|---|
| 3,123,996 | 3/1964 | Musial | 73—190 X |
| 3,167,956 | 2/1965 | Grey | 73—340 X |

RALPH G. NILSON, Primary Examiner

D. L. WILLIS, Assistant Examiner

U.S. Cl. X.R.

73—340